B. I. AVILOV.
DIFFERENTIAL LOCK FOR VEHICLES.
APPLICATION FILED SEPT. 5, 1917.

1,262,430. Patented Apr. 9, 1918.
2 SHEETS—SHEET 1.

Witnesses:
Chas. E. Whiteman
H. D. Penney

Inventor:
Boris I. Avilov.
By his Atty. P. H. Richards

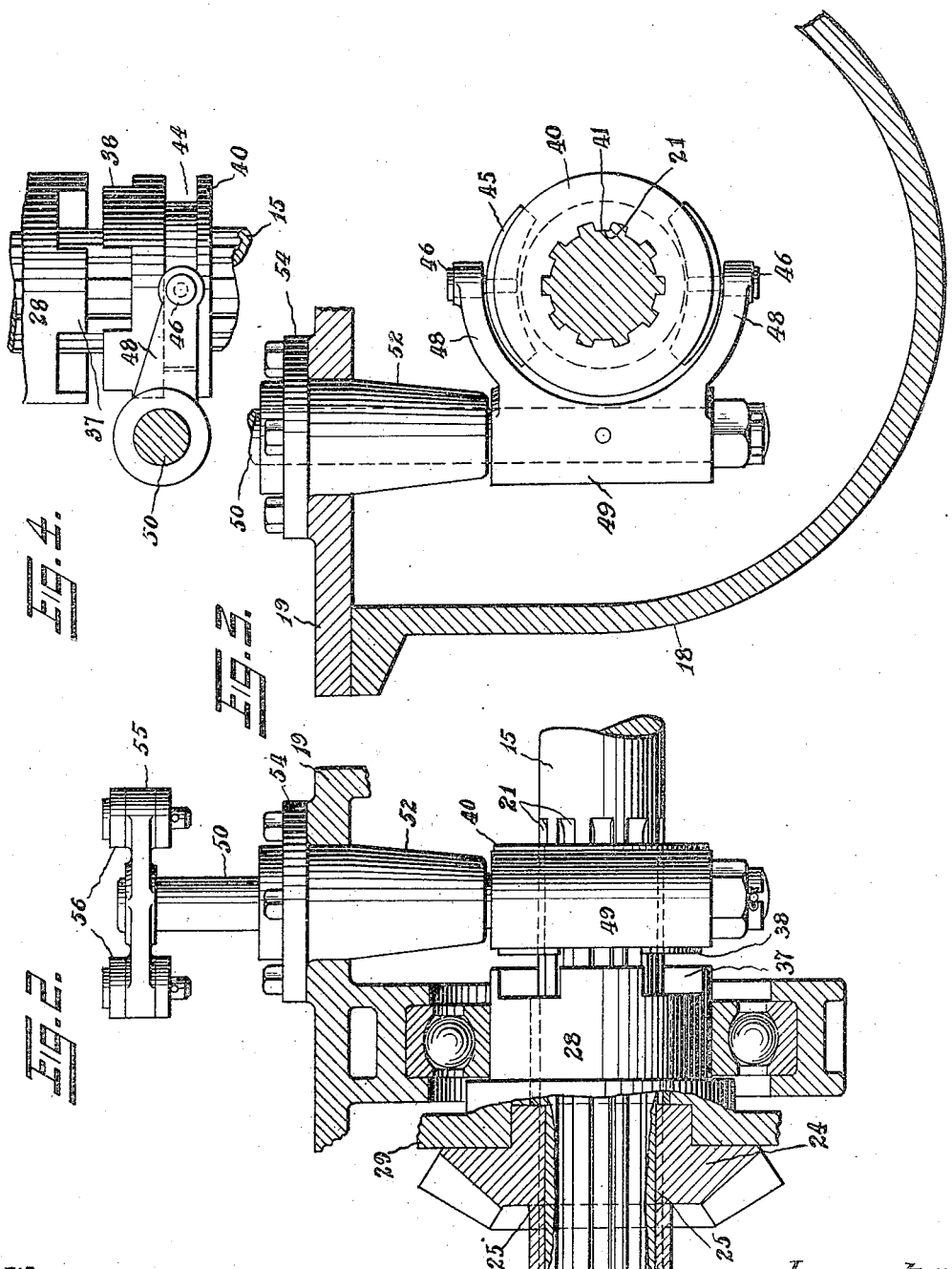

UNITED STATES PATENT OFFICE.

BORIS I. AVILOV, OF NEW YORK, N. Y., ASSIGNOR TO AKSAI MACHINERY CORPORATION, OF NEW YORK, N. Y., A CORPORATION OF RUSSIA.

DIFFERENTIAL LOCK FOR VEHICLES.

1,262,430.  Specification of Letters Patent.  Patented Apr. 9, 1918.

Application filed September 5, 1917. Serial No. 189,804.

*To all whom it may concern:*

Be it known that I, BORIS I. AVILOV, a citizen of Russia, residing in the city, county, and State of New York, have invented certain new and useful Improvements in Differential Locks for Vehicles, of which the following is a specification.

This invention relates to differential gearing for vehicles, particularly motor trucks, and for other purposes, and has for its object to improve generally the construction of such devices and to provide efficient and economically manufactured means whereby the divided shaft whose sections are under the control of the differential gearing may be locked together at the will of the operator, in order to obviate tractive losses and other undesirable results which often result from the action of ordinary differential gearing. By means of my invention, it is possible to neutralize the differential action of the gearing to prevent one axle section from spinning around loosely when its wheel does not properly engage the ground, while the other wheel is engaged in tractive effort. Another advantage is that the differential action can be temporarily put out of action in case of injury to some one of the gears thus permitting the vehicle to be brought to the repair shop without further injury to the gearing. These and other objects and advantages will appear as the description proceeds.

While herein I describe minute details of the invention, the invention is not limited to these, since the details of construction and combination may be greatly varied without departing from the spirit and scope of the invention as claimed.

In the accompanying drawings, showing by way of example, one of the many possible embodiments of the invention;

Fig. 2 is a fragmental vertical sectional view showing details of my invention;

Fig. 3 is a fragmental transverse sectional view showing the clutch mechanism of my invention in end elevation; and Fig. 4 is a plan view of the clutch mechanism.

Figure 1:
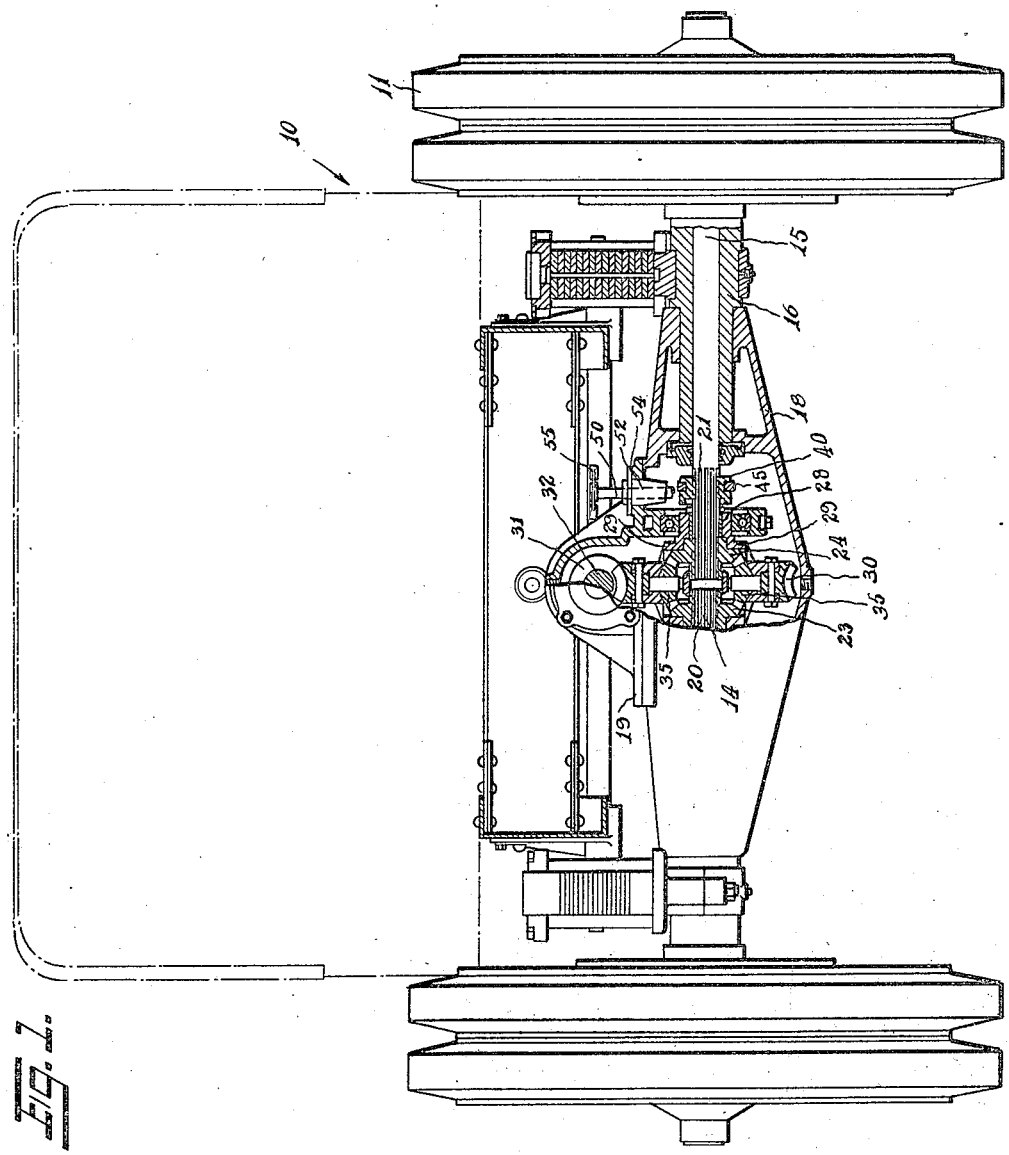
Figure 1 is a rear elevation of a motor vehicle showing my invention applied thereto.

My invention is shown applied to a motor vehicle 10, provided with drive wheels 11 mounted on axle sections 14 and 15 of the usual divided drive axle of the vehicle. The axle sections 14 and 15 are rotatably mounted in bushings 16 carried in opposite ends of the axle gear casing 18 provided with a cover 19 providing access to the interior thereof. The axle sections 14 and 15 are respectively provided at their inner ends, with groups of longitudinally disposed seats or grooves 20 and 21, the grooves 21 on the section 15 which will hereinafter be designated the clutch section, being much longer than the grooves 20 for a reason which will appear. Upon the respective inner ends of the respective axle sections are fixed the usual master gear wheels 23 and 24, the central bore of each of which is provided with a plurality of longitudinal projections 25 engaging in said grooves 20 and 21, whereby all possibility of rotation of said gear wheels relative to said axle sections is prevented. These gear wheels are suitably fixed against longitudinal movement on their respective axle sections.

Loosely mounted on said clutch section 15 adjacent to the master gear wheel 24, is a hub 28 of a differential housing or frame 29, at the peripheral portion of which housing is mounted a worm wheel 30, adapted to be engaged and driven in the usual manner by a worm 31, carried on the drive shaft 32, suitably driven from the engine of the vehicle. Upon the inner face of the peripheral portion of the housing 29 are rotatably mounted the planet gear wheels 35, each intermeshing with both of said master gear wheels.

At the outer end of said hub 28, there are provided a plurality of clutch teeth 37, adapted to be engaged by similar teeth 38, provided on the inner end of a clutch sleeve 40 slidably mounted on said clutch section 15 and held against rotation relative thereto by means of a plurality of longitudinal interior ribs 41 engaging in said grooves 21. The outer face of said clutch sleeve 40 is provided with an annular groove 44 in which engage a pair of opposed shifting dogs 45 mounted by means of pins 46, to the ends of a pair of arms 48 of the shifting crank 49, fixed on the control spindle 50, rotatably mounted in a bearing 52 having its flange 54 bolted to the cover 19. At the outer end of said spindle 50, is fixed a two-armed control lever 55, to which are pivotally secured links 56 or the like, leading to suitable operating means, (not shown), at a convenient part of the vehicle.

When the clutch lever 40 is moved out of engagement with the hub 28, as a result of actuation of the links 56, the differential gearing operates in the usual manner of such gears. If however, for any reason it be desired to lock the axle sections against relative rotation, the links 56 and lever 55 are operated so as to bring the teeth 38 into mesh with the teeth 37, whereupon the shaft 15, the housing 29, and the master gear wheel 24, are locked against relative rotation, and the planet gear wheels 35 are locked against displacement, relative to the master gear wheel 24. Since the planet wheels are not displaced relative to the master gear wheel 24, they cannot rotate, and there can be no relative movement between the planet wheels and the master wheel 23. Therefore the master wheels 23 and 24 are locked against rotation relative to each other, as are also the axle sections 14 and 15.

When it is desired that the axle sections shall again rotate relatively to each other, it is only necessary to manipulate the lever 55 to bring the teeth 37 and 38 again out of mesh.

I claim as my invention:

1. In a differential gear lock, the combination of a pair of alined shaft sections one of which is provided with longitudinal grooves at its inner end portion; a master gear wheel fixed on said portion of the one section and provided with interior longitudinal projections engaging in said grooves; a master gear wheel fixed on the other section; a housing having a hub loosely mounted on said end portion and provided with clutch teeth at its outer end; planet gear wheels mounted in said housing and engaging said master gear wheels; a clutch sleeve toothed at its inner end to engage said clutch teeth and having interior longitudinal ribs slidably engaging in said same grooves; means for shifting the sleeve; and means for rotating the housing.

2. In a differential gear, the combination of a pair of alined members one of which is provided with a longitudinal groove; master wheels fixed on the alined members, a rotatable member provided with clutch teeth; planet wheels on the rotatable member and engaging the master wheels; and a clutch member slidable on the grooved member and provided with a projection engaging in the groove and having teeth engaging the clutch teeth.

3. In a differential gear lock, the combination of a pair of alined members one of which is provided at one portion with longitudinal grooves; a master wheel fixed on said portion of one member and provided with longitudinal projections engaging in said grooves; a master wheel fixed on the other member; a rotatable member embracing said portion and provided with clutch teeth; planet wheels mounted on said rotatable member and engaging said master wheels; a clutch member provided with teeth engaging said clutch teeth and provided with longitudinal ribs engaging in said same grooves; means for shifting the clutch member; and means for rotating the rotatable member.

4. In a differential gear, the combination of a pair of alined members, one of which is provided with longitudinal shoulders at its inner end portion; a master wheel fixed on said portion of the one member and provided with shoulders engaging the first named shoulders; a master wheel fixed on the other member; a rotating member provided with a part embracing said portion and provided with a clutch face; planet wheels mounted on the rotary member and engaging said master wheels; a clutch member having a clutch face engaging the first named clutch face and provided interiorly with shoulders slidably engaging said first named shoulders to prevent relative rotation between said clutch member and the associated alined member; and means for shifting the clutch member.

5. In a differential gear lock, the combination of a pair of alined axle sections each provided with a longitudinally grooved portion at the inner end; master gear wheels fixed to said ends and provided with longitudinal projections engaging in the grooves of said ends; a housing having a hub loosely mounted on one of said grooved portions and having clutch teeth at its outer end; planet gear wheels in the housing and engaging said master wheels; a clutch sleeve toothed at its inner end to engage said clutch teeth and having interior longitudinal ribs slidably engaging in the same grooves in which engage said projections of the master gear wheel of the axle section carrying said hub; means for shifting said sleeve; and means for rotating said housing.

6. In a differential gear lock, the combination of a gear casing; a pair of alined axle sections mounted in said casing and each provided with a longitudinally grooved inner end; master gear wheels fixed respectively on the grooved portions of said sections and spaced a short distance from each other; a rotatable housing having a hub loosely mounted on one of said axle sections and provided at its outer end with clutch teeth; planet gear wheels mounted in said housing and disposed between said master gear wheels, each planet wheel meshing with both master wheels; a clutch sleeve having an outer annular groove, and toothed at its inner end to engage said clutch teeth and slidably mounted on the axle section carrying said hub and provided with interior longitudinal ribs engaging in the longitudinal grooves of the axle section; pivoted crank arms provided with opposed dogs engaging in said annular groove; a worm wheel carried on said rotatable housing; and a drive worm meshing with the worm wheel.

BORIS I. AVILOV.

Witnesses:
I. M. PROKOFIEFF,
H. M. KILPATRICK.

Copies of this patent may be obtained for five cents each, by addressing the "Commissioner of Patents, Washington, D. C."